United States Patent

Clark et al.

[15] 3,686,469

[45] Aug. 22, 1972

[54] STEADY STATE PHASE ERROR CORRECTION CIRCUIT

[72] Inventors: Harold V. Clark, Palo Alto; Gerald C. Engbretson, Burlingame, both of Calif.

[73] Assignee: Ampex Corporation, Redwood City, Calif.

[22] Filed: April 2, 1970

[21] Appl. No.: 25,053

[52] U.S. Cl. .............179/100.2 T, 318/603, 328/155

[51] Int. Cl. ............................G11b 5/52, H03b 3/04

[58] Field of Search .........179/100.2 T; 340/347 DA; 318/603, 608, 653; 307/220, 252; 328/37, 41, 48, 51, 133, 155; 235/92 PS; 178/6.6 P

[56] References Cited

UNITED STATES PATENTS

| | | | |
|---|---|---|---|
| 3,502,976 | 3/1970 | Chamberlin, Jr. et al. | 328/155 X |
| 3,206,665 | 9/1965 | Burlingham | 318/603 X |
| 3,271,688 | 9/1966 | Gschwind et al. | 328/155 X |
| 3,379,828 | 4/1968 | Smith | 179/100.2 X |
| 3,404,857 | 10/1968 | Tippetts | 340/347 X |
| 3,496,562 | 2/1970 | Smith | 340/347 |
| 3,505,673 | 4/1970 | James | 340/347 |
| 3,512,085 | 5/1970 | Peterson et al. | 328/133 X |
| 3,514,537 | 5/1970 | Uemura | 179/100.2 X |
| 3,553,443 | 1/1971 | Neil | 340/347 X |

*Primary Examiner*—Malcolm A. Morrison
*Assistant Examiner*—Jerry Smith
*Attorney*—Robert G. Clay

[57] ABSTRACT

In a servo system in which the angular phase of a rotating member is synchronized to the phase of a reference signal by a dynamic servo loop, circuitry is shown operating in cooperation with the dynamic servo loop for developing a variable DC bias signal for eliminating residual phase errors remaining during the dynamic servo control. In particular, the rotating member is embodied by a rotary transducer assembly carried by a wideband magnetic tape transport in which the transducer assembly is to be rotatably controlled by the servo systems so as to scan a prerecorded signal carried by the magnetic tape at a rate and phase which causes the signal thereby reproduced to occur in synchronous with a reference timing signal. The variable DC phase bias signal is developed by increasing or decreasing the level of an up/down binary counter by feeding relatively low rate clock pulses thereto and conditioning the direction of the counter in accordance with the detection of phase lead or phase lag between the reference and reproduce signals. A digital-to-analog converter is coupled to and responsive to the counting level of the binary counter to issue a step variable DC voltage having a magnitude and polarity corresponding to the number of counting states and the direction thereof away from a normal mid-modulus count level of the counter preselected as the nominal or zero phase error operating point of the circuit.

8 Claims, 3 Drawing Figures

INVENTOR.
HAROLD V. CLARK
GERALD C. ENGBRETSON
BY
[signature]
ATTORNEY

INVENTOR.
HAROLD V. CLARK
GERALD C. ENGBRETSON

BY [signature]
ATTORNEY

STEADY STATE PHASE ERROR CORRECTION CIRCUIT

The present invention relates in general to servo control systems and more particularly to a servo circuit for eliminating the relatively small steady state residual phase errors in a dynamically phase controlled electrical or electro-mechanical system.

In particular, the present invention is adapted for controlling the rotational phase of a rotary transducer assembly such as employed by most wideband magnetic tape recorders, for example, recorders adapted for processing video signals. In transports of this type, playback of a prerecorded video signal requires a control over the rotational phase of the rotary transducer assembly, sometimes referred to as the head wheel, such that the synchronizing waveforms of the reproduced video signal developed thereby can be precisely synchronized to the standard of the synchronizing waveforms of a studio reference signal. This synchronous condition is typically achieved by employing a phase comparator to develop a dynamic error signal controlling the phasing of the rotary transducer assembly in response to any phase differences between the reproduce synchronizing waveform, such as the vertical sync pulse and the corresponding studio or reference vertical synchronizing waveform.

Systems such as this, when comprised of a synchronous motor driven by a voltage-controlled oscillator, not only provide dynamic phase control of the rotary mechanism but in addition, due to the phase integrating feature of such devices, substantial elimination of steady state residual phase errors is inherently provided. However, advancement in the art of wideband and video recording has led to the use of direct current motors, which are preferred for driving the rotary transducer assembly due to, among other things, ease by which DC motors can be servo controlled. On the other hand, DC motors, unlike synchronous motors, are subject to variations in loading and DC drift in the associated circuitry and other effects leading to steady state phase errors in the control loop.

Accordingly, it is an object of the present invention to provide a means for developing a steady state or DC bias signal for summation with the other error signals such as the dynamic phase error signal to eliminate the relatively small residual steady state phase discrepancies, wherein such means is particularly adapted for phase control of DC motors.

These and other objects are achieved, in accordance with the present invention, by developing a steady state phase error signal through the use of a counter responsive to relatively low frequency clock pulses, wherein the counter is conditioned to increase or decrease its counting state from a preselected midpoint on the modulus thereof in response to detected phase lead or phase lag between two signals representing the mechanisms or circuits to be phase synchronized. The counting state of the counter is transformed to a useful control signal by a digital-to-analog converter, cooperating with the counter to provide small step increases in the magnitude of the steady state phase error, each time the counter increases or decreases another step in a direction away from a preselected mid-modulus counting state. Once the system settles on a proper steady state error signal at the output of the digital-to-analog converter, the state of the counter is frozen by circuitry responsive to the acquiescence of coincidence between the signals to be synchronized. In this regard, the present invention functions in a similar manner to a motor driven potentiometer, in which the motor continues to advance the rotation of the potentiometer wiper arm until a particular steady state phase error has been eliminated.

These and other objects, features and advantages of the invention will become apparent from the following description and accompanying drawings illustrating the preferred embodiment of the invention, wherein.

Figure 1:
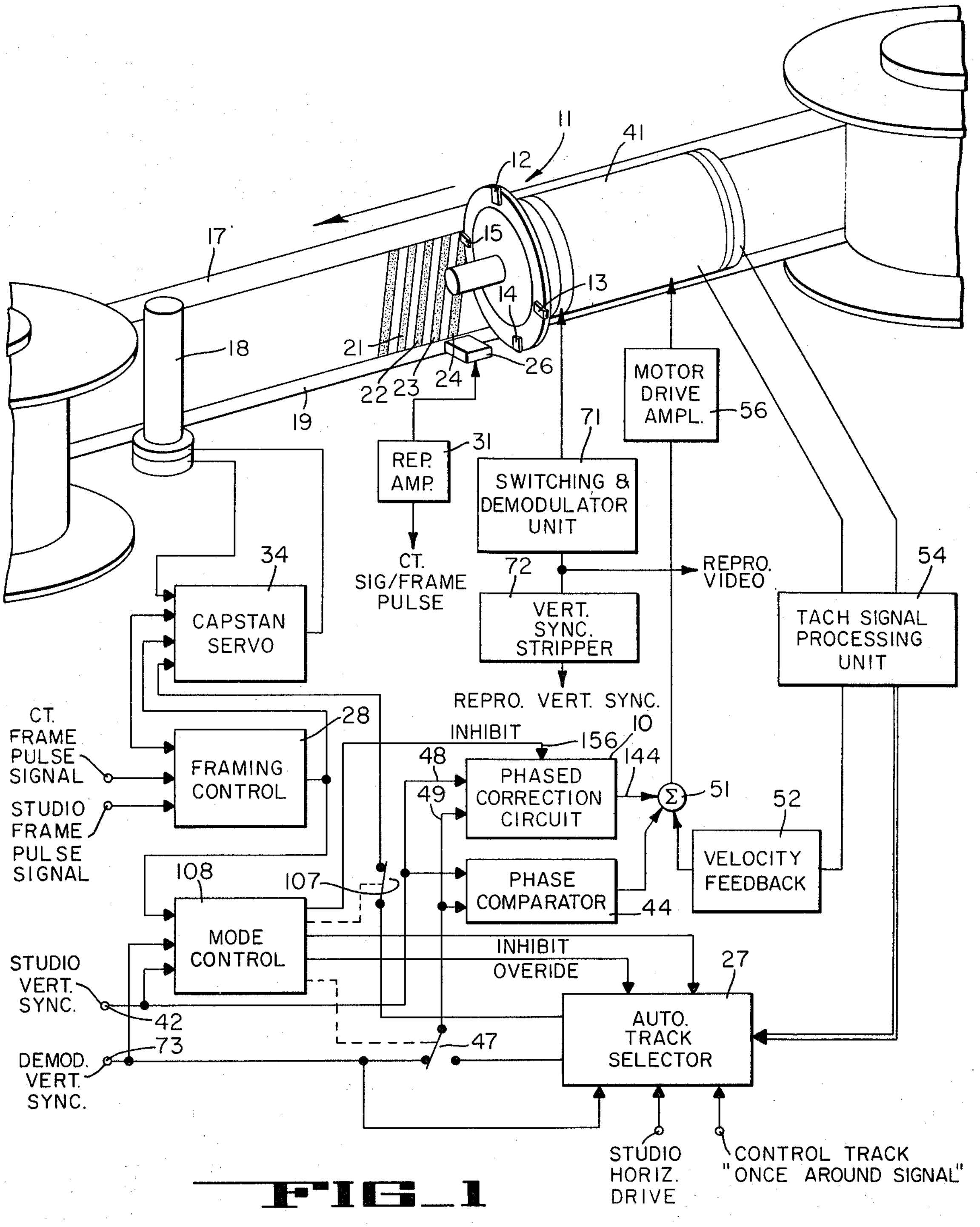
FIG. 1 is a diagrammatic view of a portion of the tape transport to be controlled and a block diagram of the servo networks arranged to control such transport in accordance with the present invention.

With reference to FIG. 1, the present invention provides a steady state phase error correction circuit 10 functioning in the environment of a servo system for controlling a wideband magnetic tape transport employing a rotary transducer assembly. Apart from circuit 10 which forms the subject matter of the present invention, the arrangement of components and operation of the system shown by FIG. 1 is described in greater detail in a copending U.S. application, Ser. No. 25,052 by Harold V. Clark, entitled "Automatic Phasing Of Servo Systems," and the applications referred to therein, all of which have been assigned to the assignee of the present application. Briefly, a magnetic tape 17 is driven by a capstan 18 passed a rotating head wheel or transducer assembly 11, carrying a plurality of four magnetic heads or transducers 12, 13, 14 and 15 in quadrature relation. Simultaneously with the translation of tape 17, assembly 11 is rotated by a DC motor 41 so that transducers 12 through 15 successively record and thereafter reproduce a wideband or video transverse track, such as shown by tracks 21, 22, 23 and 24 with tape 17. The rotational speed and phase of capstan 18 is controlled by capstan servo 34 while the rotation of the transducer assembly is controlled by a velocity feedback loop consisting of a tachometer signal processing unit 54 and a velocity feed back circuit 52; and a phase feedback loop consisting of an automatic track selector 27, a phase comparator 44 and the steady state phase error correction circuit 10 of the present invention. Both the velocity and phase feedback loops are coupled through a summing junction 51 for selective energization of motor 41 through a motor drive amplifier 56 which is responsive to the summation or resultant error signal developed at junction 51.

For the purpose of describing the present invention, it will be assumed that the servo systems controlling transducer assembly 11 and capstan 18 have attained a final playback or reproduce mode wherein transducer assembly 11 has settled to the dynamic phase comparison between studio vertical sync pulses received at terminal 42 and the reproduce vertical sync pulses received at a terminal 73. Thus, switch 47 is in a position connecting terminal 73 to a line 49 so that phase comparator 44 dynamically controls the phase angle of transducer assembly 11 such that the studio reference vertical sync and reproduce vertical sync are substantially coincident. During this same operating mode, capstan 34 is connected through switch 107 to synchronize the longitudinal translation of tape 17 to the rotation of assembly 11. Phase comparator 44 is sensitive to rapid variations of the timing relationship between studio vertical sync and reproduce vertical sync for effecting dynamic servo corrections by way of an error signal applied to summing junction 51. The resulting error signal at junction 51 causes an appropriated adjustment of the energization of motor 41. Comparator 44 is nevertheless incomplete in its attempt to precisely synchronize the reference and reproduce signals. As noted above, a certain amount of steady state or DC residual phase error remains in the feedback loop which includes comparator 44. Such steady state phase error is diagramatically illustrated in FIG. 3 wherein the waveforms indicated by reference arrow 134 show a relatively small but consistent phase lag of the reproduce vertical sync pulses with respect to the studio reference sync pulses.

Figure 2:
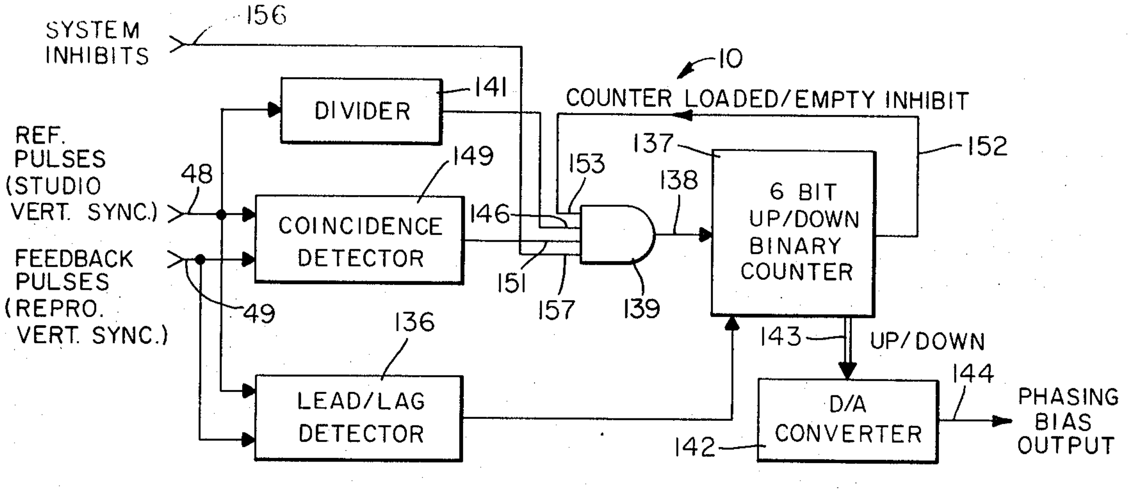
FIG. 2 is a detailed schematic diagram of tee steady state phase correction circuit of FIG. 1.

In accordance with the present invention, steady state phase error correction circuit 10 serves to effect a variable DC phase bias correction to eliminate small steady state phase lead or lag between the reproduce and reference pulse signals. As shown by FIG. 2, circuit 10 receives the reproduce and studio sync pulses from lines 48 and 49 whereupon a lead/lag detector 136 functions to selectively condition a binary counter 137 to count up or count down depending upon whether a phase lead or lag has been detected between the pulses appearing on lines 48 and 49. One of the signals may be arbitrarily designated as a reference relative to which the remaining signal may be in phase lead or lag.

Detector 136 is constructed with conventional logic elements in a well known manner so as to dispose a bistable device in one or the other of its states depending upon which of the pair of approximately coincident pulses occurs first. While detector 136 thus determines whether counter 137 will increase or decrease its binary counting state, the actual counting operation is performed in response to clock pulses received at an output 138 of an electrical gate 139.

In the present embodiment, the clock pulse train is conveniently derived directly from the train of studio or reference sync pulses available on line 48 after a suitable reduction in frequency provided by pulse rate divider 141 having an output connected to one of the inputs to gate 139. Here, divider 141 is selected to divide the pulse rate by a factor of 8, which sufficiently reduces the frequency of the clock pulses such that the operation of the circuit shown by FIG. 2 does not interfere with the higher frequency dynamic servo loops. Alternatively, an auxiliary clock pulse generator can be employed, operating independently of any of the various signals already available. The approximate rate of the clock pulses for the present embodiment is 7 per second, which would be the design frequency of the auxiliary or external clock pulse generator. Such frequency has been found in the present embodiment to avoid interaction with the dynamic response ranges of the associated feedback loops, such as that of phase comparator 44.

In order to make use of the count information carried by counter 137 indicating the direction and magnitude of steady state phase error between the reproduce vertical sync and studio vertical sync pulses, a digital-to-analog converter 142 is provided for responding to the instantaneous binary condition of counter 137 over connection 143 and in accordance therewith develop a step variable DC or steady state bias voltage at an output 144. Counter 137 and converter 142 are adjusted such that a counting state occurring midway between zero and maximum states of the counter modulus corresponds to a zero bias voltage at output 144 of converter 142 so that the nominal operating point of the circuit occurs at the selected midpoint of the counter. As the counting state of counter 137 responds to detector 136 and the clock pulses passed by gate 139 to either increase or decrease its binary count state from the preselected midstate, then the output of converter 144 will develop a voltage signal having a magnitude corresponding to the number of counting states away from midcount and a polarity corresponding to the direction (up/down) in which that count occurs. The polarities involved are selected, of course, to bias the rotational phase of transducer 11 so as to decrease the phase lead or lag.

Figure 3:
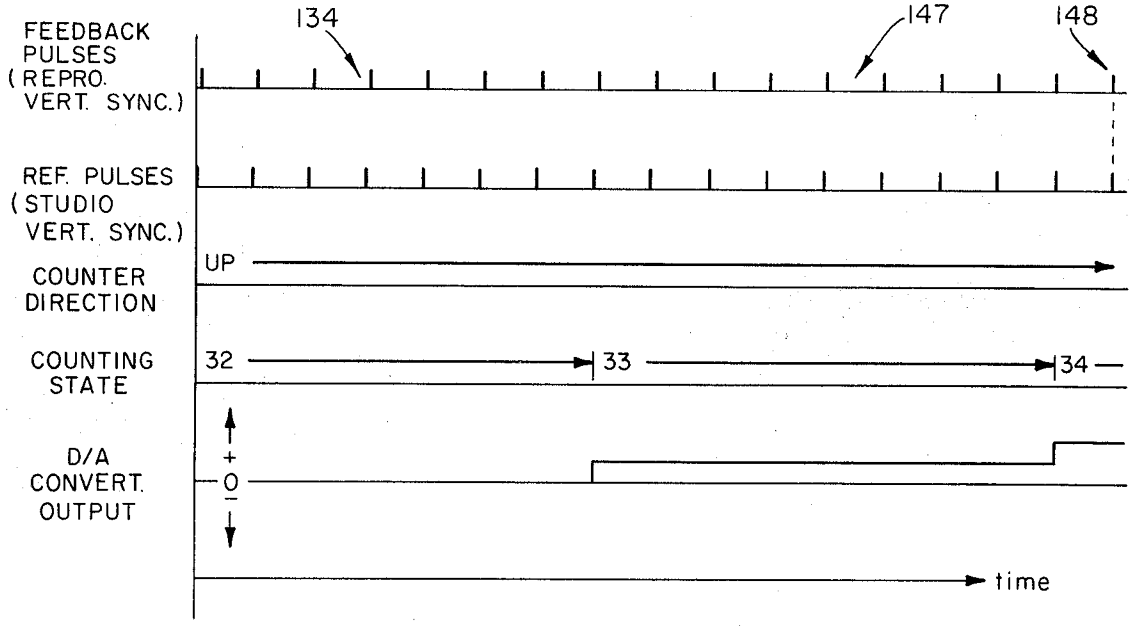
FIG. 3 is a graph illustrating the timing relationship between various waveforms of the circuits shown by FIGS. 1 and 2, during operation in accordance with the present invention.

The foregoing operation is clearly illustrated by the waveforms of FIG. 3, wherein the initial steady state condition shows the reproduce vertical sync pulses slightly lagging the studio vertical sync pulses. This phase lag condition is sensed by detector 136 which functions in this instance to dispose counter 137 to count in the up direction. Counter 137, which here has a six binary bit capacity enabling counts from 0 to 63, is initially in a counting state of 32, or midway between its empty and fully loaded conditions. The system is designed to normally operate midrange of the modulus of counter 137 and the counting state of 32 corresponds to a zero voltage output from converter 142. These conditions continue until eight pulses have occurred in the reference reproduce vertical sync pulse train on line 48, whereupon divider 141 causes the eighth pulse or a pulse representative thereof to pass to an input 146 of gate 139. Assuming the remaining inputs of gate 139 are properly conditioned as described more fully herein, this eighth pulse is passed by gate 139 to output 138 and from there into counter 137. In accordance with the direction control provided by detector 136, counter 137 advances to a counting state of 33 which in turn causes converter 142 to issue a relatively small steady state or DC voltage, in this instance of positive polarity. This small positive bias voltage is applied to summing junction 51 of FIG. 1 to effect a correspondingly minute change in the rotational phase of transducer assembly 11.

The corrective effect of bias voltage is indicated by the merging phase relationship between the feedback and reference pulse trains in the region shown by reference arrow 147. However, there still remains a slight lag of the reproduce vertical sync pulses behind the studio vertical sync pulses, and thus at the eighth pulse following the previous correction, counter 137 is advanced further to a counting state of 34 which causes converter 142 to provide a incremental positive increase in the bias voltage applied to summing junction 51 via output 144. In this case, sufficient steady state correction has been effected so that the reproduce and studio pulses indicated at reference arrow 148 are precisely coincident.

In accordance with the characteristic variable DC bias provided by the present invention, it is necessary to maintain the bias voltage at the output of converter 144 constant so long as the sync waveforms of the two pulse signals remain precisely in coincidence. Accordingly, the present invention provides a coincidence detector 149 having its inputs connected to receive the pulses on lines 48 and 49 and provide a logic signal on an output line 151 for rendering gate 139 nontransmissive when coincidence between the pulse trains is detected. For this purpose, output line 151 is connected as one of the inputs to gate 139 and is conditioned by detector 149 upon input pulse coincidence to block passage of the one in eight reference vertical sync pulses issued by divider 141. Thus, so long as coincidence continues, the counting state of counter 137 remains frozen and the output of converter 142 stays content.

In certain operations, it is desired to prevent counter 137 from exceeding its upper and lower count limits and thereupon recycle in response to large phase lead and phase lag errors between the reproduce and studio vertical sync pulses. To avoid such recycling, a circuit connection 152 is provided between the counter 137 and an input 153 of gate 139 for rendering the gate nontransmissive when the counter enters an empty or fully loaded counting condition. Assume, for example, that a large lag phase error causes the counter to continue to count up in response to the incoming clock pulses and this counting continues such that the counting state reaches the maximum or fully loaded count level without obtaining coincidence between the pulse trains. It may be desirable to maintain that level and allow the phase of the assembly 11 to stabilize thereto rather than cause the counter to recycle on the next clock pulse to a zero counting state.

Accordingly, circuit connection 152 functions to freeze counter 137 in its empty or fully loaded condition by blocking further transmission of the clocking pulses to the input of the counter until and if detector 136 effects a change in the counting direction. If detector 136 switches from a lag to a lead indication or vice versa, the counter is unlocked by rendering gate 139 transmissive in response to circuit connection 152 which causes the transmitted clock pulses to advance the count on counter 137 toward its normal mid-modulus operating point, away from either the empty or fully loaded condition thereof.

As the six bit counter 137 provides 64 counting states, it is advantageous to utilized each of these states by dividing the voltage output of converter 142 into 464 equal incremental voltage steps. The voltage level at midpoint of the output voltage range developed by converter 142 is selected so that when summed with a reference voltage (not shown) provided at junction 51, the system if operating normally, that is without DC phase error, provides precise phase coincidence between studio vertical sync and reproduced vertical sync. Incremental increases or decreases from this midpoint voltage provides the desired phase bias corrections. Thus, if the output voltage from comparator 142 is thought of as being normalized to zero, an increase or decrease relative to this normalized zero level occurs in opposite polarity directions as illustrated above in connection with FIG. 3. In the present embodiment, it has been found convenient to design the 0 to 63 (or 64) bias voltage steps available from converter 142 to provide step changes in the timing of the reproduce vertical sync pulse by an amount approximately equal to ½ microsecond.

With reference to FIG. 1, the remaining components illustrated therein are described in greater detail in the above reference copending U.S. Pat. application. Briefly however, a record/reproduce transducer 26, together with a reproduce amplifier 31, functions to develop a control signal from a control track 19 for processing by capstan servo 34 and a framing control 28 so as to effect a proper tracking relationship between the transducers of assembly 11 and each of the transverse video tracks of tape 17.

The off tape vertical sync pulse is reproduced for receipt at terminal 73 by the combination of a switching and demodulator unit 71 connected to receive the output signals from transducers 12–15 and a vertical sync stripper 72 connected to the output of unit 71 as shown.

A mode control 108 functions to automatically sequence the transport system and various preliminary servo modes leading up to a final and stabilized playback mode.

Mode control 108 cooperates in conjunction with the present invention by providing an inhibit control signal over a line 156 which, as best shown by FIG. 2, operates in addition to other signals to control the transmission of gate 139. In particular, gate 139 receives at its input 157 an inhibit signal from control 108 over line 156 for blocking transmission of the clock pulses received at gate input 146 during certain predetermined modes of the transport system such as during standby and during the preliminary servo modes leading up to final playback.

In addition to the operation of the invention as described above for the playback mode, circuit 10 functions in a similar manner when the transport is in a ready mode (with assembly 11 rotating but not contacting tape 17) and during the record mode (when the transducers of assembly 11 actually engage the tape surface for recording thereon). During these latter modes of operation, there is of course no reproduce vertical sync to which the rotation of assembly 11 is to be synchronized. However, during the ready and record modes, it is desireable to synchronize the phase of assembly 11 such that one of transducers 12–15 is scanning the midpoint of the tape width at the occurrence of the studio vertical sync waveform or the vertical sync waveform of the signal to be recorded. For this purpose, circuit 10 is adapted to receive a feedback signal over line 49 representing the rotational position of assembly. In practice, this feedback signal is obtained by dividing by four the standard phase once around tachometer signal developed by unit 54 as described in the above referenced copending U.S. application, Ser. No. 25,052. To a certain extent, the desired phase positioning of the head wheel assembly during these modes is achieved by the dynamic operation of comparator 44. However, as in the case of the reproduce mode, a certain amount of DC or steady state phase error prevents the rotational phase of assembly 11 from achieving the desired midtape position at precisely the proper time. Accordingly, correction circuit 10 functions to receive the divided by four tachometer feedback signal over line 49 and studio vertical sync over line 48. In response to the detection of lead or lag therebetween by detector 136, counter 137 is stepped off its central counting position in a direction and for the necessary number of counting steps to cause converter 142 to correct the steady state phase lag or lead.

What is claimed is:

1. A circuit for developing a variable DC error signal for eliminating static phase errors in a dynamically phase controlled servo system, comprising:
   - clock pulses generator means,
   - phase lead and lag detector means for sensing the direction in which such static phase error occurs,
   - counting means connected to said clock pulse generator for registering a change in count in response to said clock pulses and having a count direction control connected to said detection means, said detection means disposing said direction control so that said counter means changes count in one direction in response to a detected lead phase error and changes count in the other direction in response to a detected lag phase error, and
   - digital-to-analog converter means connected to said counter and having an output developing an incrementally variable DC signal in response to the count registered by said counter, whereby said output signal serves as a phase error bias signal for correcting steady state phase errors in the servo system.

2. In a transport system as defined by claim 1, the combination wherein said counter means and digital to analog converter means are cooperatively adjusted to provide a zero static error signal at substantially midcount of the counting range provided by said counter, and further comprising circuit means responsive to the maximum and minimum counting states of said counter means and the direction control thereof for inhibiting response of said counter means to said clock pulses.

3. In a transport system having a rotary transducer assembly for scanning prerecorded tracks on a record medium as such medium is advanced passed the assembly and a servo means for controlling the phase of rotation of the transducer assembly such that a reproduced synchronizing signal from the medium is dynamically phase locked to a reference synchronizing signal, the combination comprising:
   - counter means for receiving a train of clock pulses, said counter means having a count direction control selectively conditioning said counter means to count up or down in response to said clock pulses;
   - phase lead and lag detector means connected to said counter direction control and for receiving the reproduced synchronizing signal and the reference synchronizing signal for disposing said counter direction control in one direction in response to the detection of a lead phase relationship between said synchronizing pulses and disposing said counter control in the other direction in response to a lag phase relationship between said synchronizing pulses; and
   - digital to analog converter means connected to said counter means developing a static analog error signal for connection to said servo means for static phase control of the rotational phase of transducer assembly.

4. In the transport system of claim 3, the combination further comprising:
   - pulse coincidence detection means for receiving the reproduce and reference synchronizing pulses and being connected to said counter means for inhibiting change of count thereof in response to detection of coincidence between the reproduced and reference synchronizing pulses.

5. In a transport system as defined by claim 3, the combination further comprising:
   - pulse frequency divider means having an input for receiving the pulses from one of said synchronizing signals and having an output connected to said counter for providing said clock pulses at a frequency less than the frequency of said reproduce and reference synchronizing signals.

6. Method of developing a variable direct current error signal for eliminating static phase errors in a dynamically phase controlled servo system, the steps comprising:
   - developing a train of clock pulses,
   - detecting static lead and lag phase errors of the system,
   - counting said train of clock pulses in a counter to register a pulse counting state therein,
   - applying said pulse train to change the count on said counter in a first direction in response to a detected phase lead error and applying said train of clock pulses to change the count on said counter in the other direction in response to a detected phase lag error of said system, and
   - developing an analog error signal having a magnitude responsive to the counting state of said counter and being fed to and for effecting static phase corrections in the servo system.

7. The method as defined in claim 6, wherein the servo system is arranged to synchronize a reproduced information signal from a magnetic tape transport with a reference signal, the steps further defined by the timing relationship between the reproduced information signal and the reference signal being used to detect phase lead and lag of the servo system, and the step of developing said train of clock pulses being provided by frequency divider means responsive to the reference signal for producing clock pulses at a rate less than the frequency thereof.

8. The method of claim 6, further comprising the step of inhibiting change of said counter in response to the servo system assuming a condition of zero static phase error.

* * * * *